US009403084B2

(12) United States Patent
Klemm

(10) Patent No.: US 9,403,084 B2
(45) Date of Patent: Aug. 2, 2016

(54) POLYGON PUZZLE AND RELATED METHODS

(71) Applicant: Rebecca Klemm, Washington, DC (US)

(72) Inventor: Rebecca Klemm, Washington, DC (US)

( * ) Notice: Subject to any disclaimer, the term of this patent is extended or adjusted under 35 U.S.C. 154(b) by 66 days.

(21) Appl. No.: 14/166,385

(22) Filed: Jan. 28, 2014

(65) Prior Publication Data

US 2015/0209661 A1 Jul. 30, 2015

(51) Int. Cl.
*A63F 9/08* (2006.01)
*A63F 9/10* (2006.01)
*G09B 23/00* (2006.01)
*A63F 9/06* (2006.01)
*G09B 19/02* (2006.01)
*G09B 23/02* (2006.01)

(52) U.S. Cl.
CPC .............. *A63F 9/10* (2013.01); *A63F 9/0666* (2013.01); *G09B 19/02* (2013.01); *G09B 23/00* (2013.01); *G09B 23/02* (2013.01)

(58) Field of Classification Search
CPC ........... A63F 9/10; A63F 9/0666; G09B 1/00; G09B 1/06; G09B 1/16; G09B 23/04; G09B 23/00; G09B 19/02; G09B 23/02
USPC .............. 273/157 R, 156; 434/160, 171, 403, 434/407, 215, 195, 196, 193, 211; D10/62, D10/64
See application file for complete search history.

(56) References Cited

U.S. PATENT DOCUMENTS

| | | | | |
|---|---|---|---|---|
| 1,173,298 A * | 2/1916 | Montessori | .................... | 434/211 |
| 2,693,963 A * | 11/1954 | Moscato | .................... | 273/157 R |
| D193,659 S * | 9/1962 | Matricardi | .................... | 434/304 |
| 3,075,304 A * | 1/1963 | Votolato | .................... | 434/160 |
| 3,280,499 A * | 10/1966 | Studen | .................... | 446/118 |
| 3,290,798 A * | 12/1966 | Gilbert | .................... | 434/191 |
| 3,381,394 A * | 5/1968 | Munro | .................... | 434/193 |
| D217,778 S | 6/1970 | Herstam | | |
| D218,242 S * | 8/1970 | Gompes | .................... | D21/479 |
| D219,216 S * | 11/1970 | Speers | .................... | 434/259 |
| D229,419 S * | 11/1973 | Matsumoto | .................... | D19/64 |
| 3,775,868 A * | 12/1973 | Moore | .................... | 434/259 |
| 3,853,321 A * | 12/1974 | Claffie | .................... | 273/239 |
| 4,168,583 A * | 9/1979 | Halpern | .................... | G09B 19/02 434/193 |
| 4,298,200 A * | 11/1981 | Kanbar | .................... | 273/157 R |
| D286,798 S | 11/1986 | Krober | | |
| 4,643,683 A * | 2/1987 | Orsini | .................... | G09B 1/24 434/170 |
| 4,808,111 A * | 2/1989 | Pratt | .................... | G09B 19/02 434/191 |
| 4,822,051 A * | 4/1989 | Nowak et al. | ............. | 273/157 R |
| D311,556 S | 10/1990 | Popek et al. | | |
| 5,074,794 A * | 12/1991 | Von Hagen | .................... | 434/193 |
| 5,190,287 A * | 3/1993 | Ishiyama | .................... | 273/156 |
| 5,203,706 A * | 4/1993 | Zamir | .................... | 434/172 |

(Continued)

OTHER PUBLICATIONS

Restriction Requirement issued Jan. 2, 2015 in Design U.S. Appl. No. 29/480,641.

*Primary Examiner* — Steven Wong
(74) *Attorney, Agent, or Firm* — The Law Firm of Andrea Hence Evans, LLC

(57) ABSTRACT

A puzzle includes a puzzle board having a plurality of cutouts, each cutout having a different geometric shape; a plurality of puzzle pieces adapted to fit within the cutouts, at least some of the puzzle pieces comprising a first segment and a second segment that mate with one another, wherein the first segment and the second segment have a mathematical correlation to the cutout into which the puzzle piece fits. A method of assembling a puzzle is also described.

17 Claims, 7 Drawing Sheets

(56) References Cited

U.S. PATENT DOCUMENTS

| | | | |
|---|---|---|---|
| D349,300 S * | 8/1994 | Lau | D19/62 |
| 5,378,184 A * | 1/1995 | Bro | A63H 3/16 273/157 R |
| 5,575,658 A * | 11/1996 | Barnard | 434/160 |
| 5,752,701 A * | 5/1998 | Kao | 273/269 |
| D429,775 S * | 8/2000 | Adelman | D21/478 |
| D457,199 S * | 5/2002 | Adelman | D21/478 |
| 6,626,678 B2 * | 9/2003 | Forbes et al. | 434/247 |
| D712,490 S * | 9/2014 | Gibbs | D21/522 |
| 2005/0184459 A1 | 8/2005 | Marantz et al. | |
| 2007/0262521 A1 | 11/2007 | Burns | |
| 2011/0095478 A1 | 4/2011 | Juenger | |
| 2012/0237904 A1 | 9/2012 | Alicea | |

\* cited by examiner

POLYGON PUZZLE AND RELATED METHODS

TECHNICAL FIELD

This patent application relates generally to puzzles, and more specifically, to an educational puzzle and related methods.

SUMMARY

According to an embodiment, a puzzle comprises: a puzzle board having a plurality of cutouts, each cutout having a different geometric shape; and a plurality of puzzle pieces adapted to fit within the cutouts, at least some of the puzzle pieces comprising a first segment and a second segment that mate with one another, wherein the first segment and the second segment have a mathematical correlation to the cutout into which the puzzle piece fits.

According to another embodiment, a method of assembling a puzzle comprises: providing a puzzle board having a plurality of cutouts, each cutout having a different geometric shape; providing a plurality of puzzle pieces, at least some of the puzzle pieces comprising a first segment and a second segment that mate with one another; and inserting each puzzle piece into a cutout that fits the puzzle piece, wherein the first segment and the second segment have a mathematical correlation to the cutout into which the puzzle piece fits.

BRIEF DESCRIPTION OF THE DRAWINGS

The features and advantages of the invention will be apparent from the following description, as illustrated in the accompanying drawings wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. While specific embodiments are discussed, it should be understood that this is done for illustration purposes only. A person skilled in the relevant art will recognize that other components and configurations can be used without departing from the spirit and scope of the invention.

Figure 1:
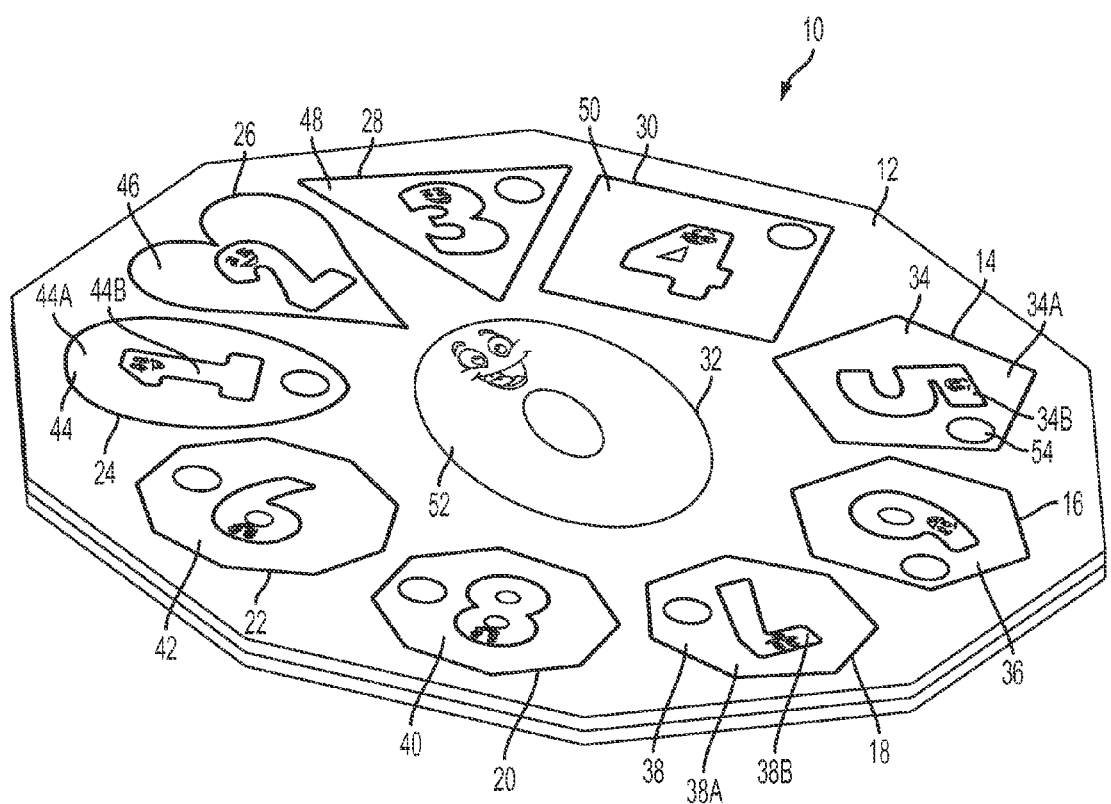
FIG. 1 is a perspective view of an embodiment of a puzzle according to the present invention.
Figure 2:
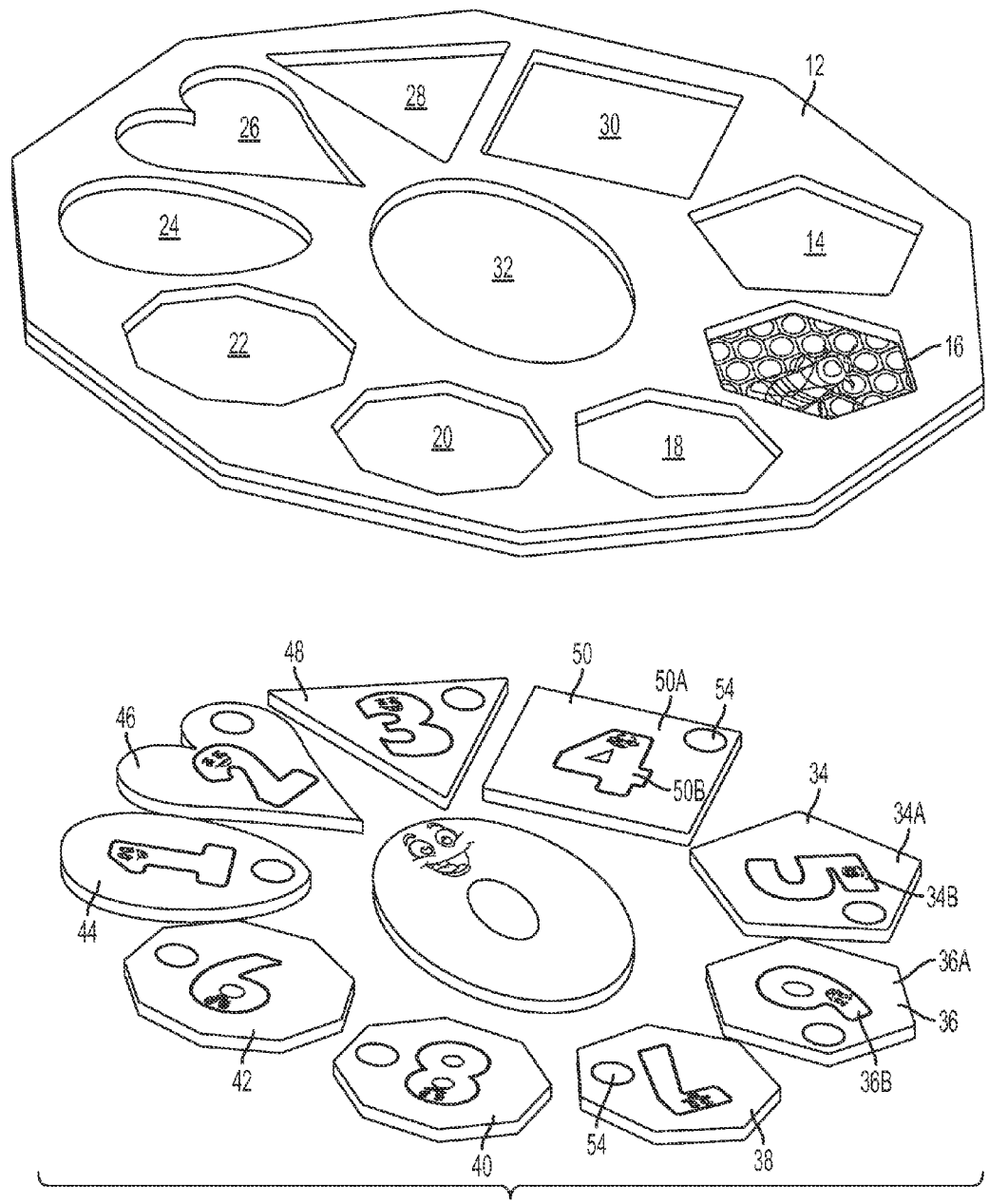
FIG. 2 is a perspective view of the puzzle of FIG. 1, showing the puzzle pieces separated from the puzzle board.

Referring to FIGS. 1 and 2, an embodiment of a puzzle 10 according to the present invention is shown. The puzzle 10 can include a puzzle board 12 having a plurality of cutouts 14, 16, 18, 20, 22, 24, 26, 28, 30. According to the embodiment shown, the board 12 can be in the shape of a decahedron, however, other shapes are possible. For example, any number of sides is possible, including even and odd numbers of sides. Further, the embodiment of board 12 shown in FIGS. 1 and 2 comprises two layers of cardboard adhered together, however, other configurations are possible.

Each of the cutouts 14-30 can have a different geometric shape, for example, with different amounts of "sides" or edges defining the geometric shape. According to the embodiment of FIGS. 1 and 2, the geometric shapes can include a "one-sided" egg shape having a pointed top, a two-sided heart shape defining points at the cleft and bottom of the "heart," an oval with no points, a triangle, square, rectangle, pentagon, hexagon, heptagon, octagon, nonagon, and decagon, respectively, however, other shapes are possible.

The puzzle 10 can also include a plurality of puzzle pieces 34, 36, 38, 40, 42, 44, 46, 48, 50 adapted to fit within the cutouts 14, 16, 18, 20, 22, 24, 26, 28, 30, respectively. FIG. 1 shows the puzzle pieces 34-50 located in their corresponding cutouts 14-30, and FIG. 2 shows the puzzle pieces 34-50 removed from the cutouts 14-30. As shown, each puzzle piece 34-50 can define an outer periphery that has the same, or substantially the same, shape as the outer periphery of the corresponding cutouts 14-30.

Still referring to FIGS. 1 and 2, at least some of the puzzle pieces 34-50 can comprise a first segment identified by the suffix "A" (see e.g., segment 34A) and a second segment identified by the suffix "B" (see, e.g., segment 34B) that fit together or mate with one another (e.g., at least partially have inverse shapes).

According to embodiments, some aspect of the first segment and the second segment can bear a mathematical correlation to the cutout into which the puzzle piece fits. Referring to puzzle piece 34 as an example, first segment 34A can have the same shape and number of sides as the corresponding cutout 14 in the puzzle board, in this case, five sides.

The first segment can define an opening into which the second segment fits. Still using puzzle piece 34 as an example, first segment 34A can have an opening in the shape of Arabic numeral "5." Likewise, the second segment 34B can have the shape of Arabic numeral five. Thus, the first segment 34A, second segment 34B, and corresponding cutout 14 are all related by the number five—the cutout 14 and first segment 34A have five sides, and the second segment is in the shape of the number 5. This same type of correlation can carry out through the remaining cutouts 16-30 and corresponding puzzle pieces 36-50.

Other mathematical relationships may be used to correlate the first and second segments and the corresponding cutout. For example, and without limitation, the second segment and opening in the first segment may have the shape of a bug, animal, object, or other item that includes the same number of certain parts (e.g., legs) as the first segment and cutout have sides. One of ordinary skill in the art will appreciate based on this disclosure that a variety of different shapes or images can be used to correlate the first segment and second segment with the corresponding cutout.

Still referring to FIGS. 1 and 2, the puzzle board 12 can also include a substantially round or oval cutout 32 (no "sides," and no "points") that receives a corresponding round or oval puzzle piece 52. According to embodiments, the cutout 32 and puzzle piece 52 can represent the numeral zero, however, other embodiments are possible. One or more of the puzzle pieces 34-52 can include a finger hole 54 to ease in picking up the puzzle piece.

Figure 3:
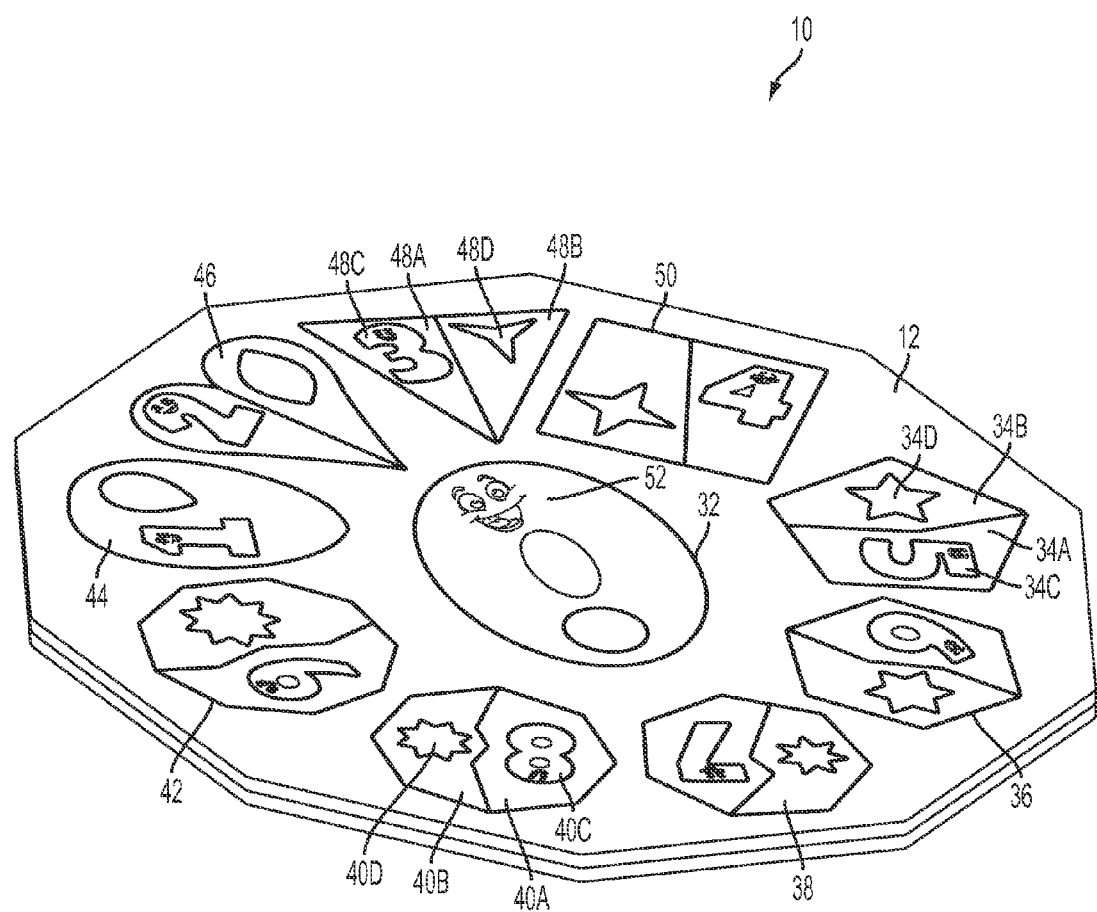
FIG. 3 is a perspective view of a second embodiment of a puzzle according to the present invention.
Figure 4:
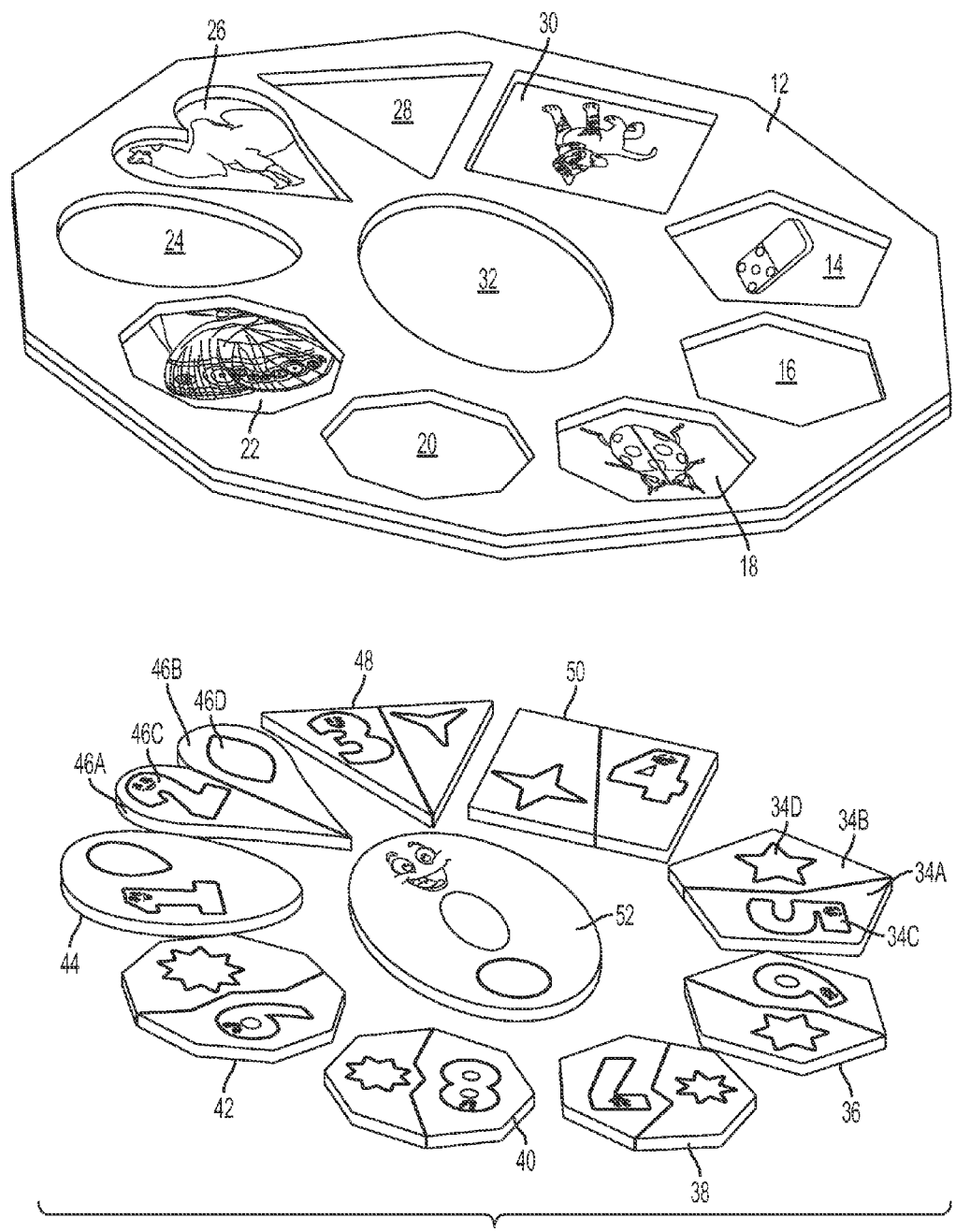
FIG. 4 is a perspective view of the puzzle of FIG. 3, showing the puzzle pieces separated from the puzzle board.

Referring to FIGS. 3 and 4, another embodiment of the puzzle 10 is shown. This embodiment can use the same puzzle board 12 as the embodiment of FIGS. 1 and 2, but can use different puzzle pieces 34-50. According to this embodiment, the puzzle pieces 34-50 can include a first segment (suffix "A"), a second segment (suffix "B"), a third segment (suffix "C"), and a fourth segment (suffix "D"). Referring to puzzle piece 34, the first segment 34A and the second segment 34B can mate or fit together, and together define the same outer periphery of the corresponding cutout 14, e.g., a pentagon. Each of the first segment 34A and second segment 34B can also include the same number of sides as the corresponding cutout 14 (e.g., in this case, five).

Still referring to FIGS. 3 and 4, and still using cutout 14 and puzzle piece 34 as an example, the third segment 34C can fit into an opening in the first segment 34A, and the fourth segment 34D can fit into an opening in the second segment 34B. The third and fourth segments 34C, 34D can have a mathematical correlation to the cutout into which the puzzle piece fits. For example, the third segment 34C can have the shape of the Arabic numeral (here, five) that equals the number of sides of the cutout 14 and puzzle piece 34, however, other mathematical correlations are possible. As shown, the fourth segment 34D can also have a mathematical correlation to the cutout 14 into which the puzzle piece 34 fits. Here, for example, the fourth segment 34D can have the shape of a star having the same number of points as the cutout 14 has sides, however, other relationships are possible. For example, and without limitation, in an alternative embodiment, the fourth segment 34D can have the shape of an instrument having the same number of strings as the corresponding cutout 14 has sides.

Figure 5:
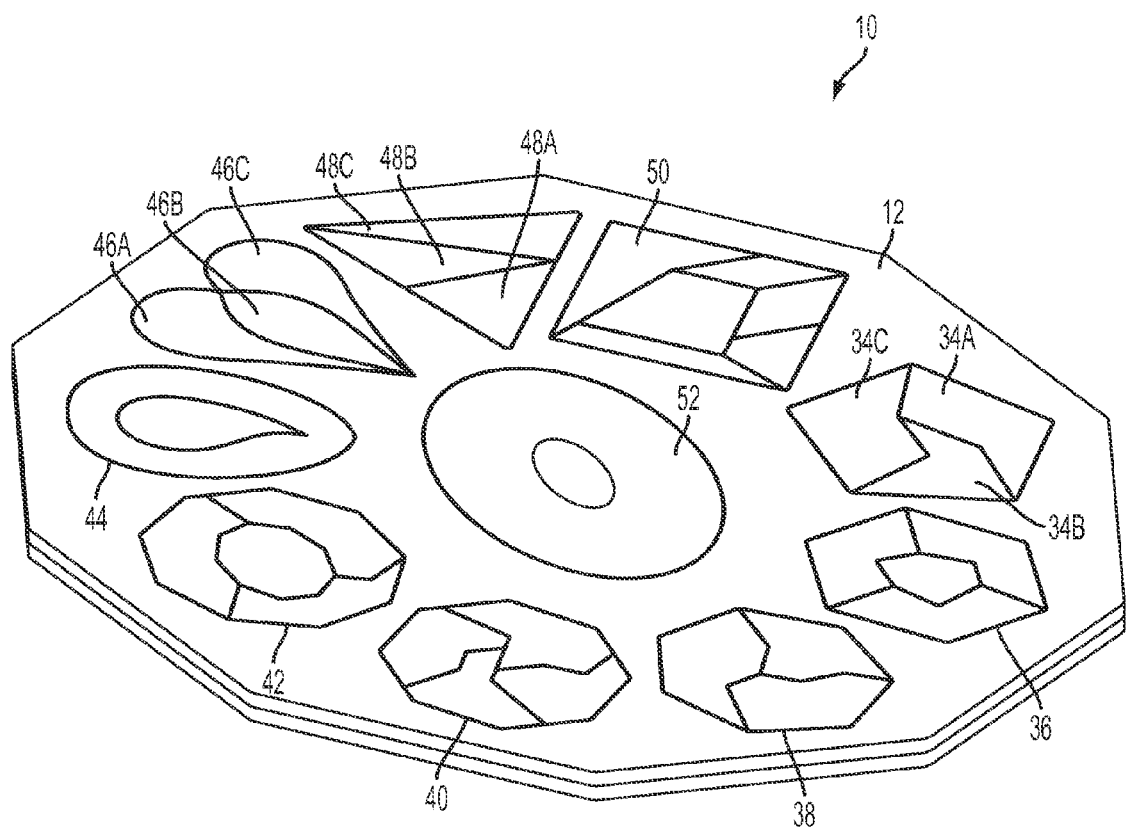
FIG. 5 is a perspective view of a third embodiment of a puzzle according to the present invention.
Figure 6:
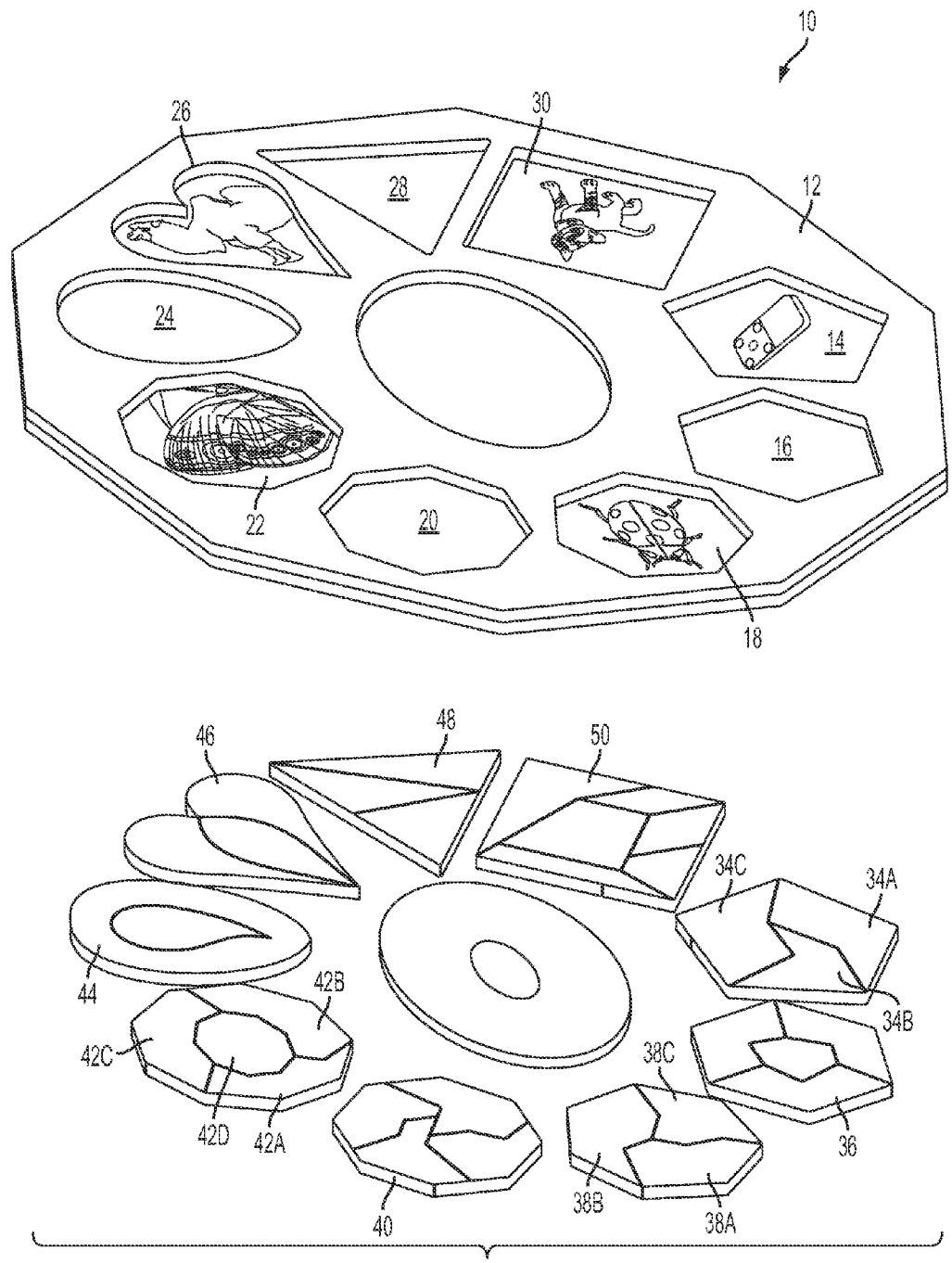
FIG. 6 is a perspective view of the puzzle of FIG. 5, showing the puzzle pieces separated from the puzzle board.

Referring to FIGS. 5 and 6, another embodiment of puzzle 10 is shown. The embodiment of FIGS. 5 and 6 can use the same puzzle board 12 as the embodiments of FIGS. 1-4, however, different puzzle pieces 34-50 can be used. According to this embodiment, each puzzle piece 34-50 can comprise a plurality of segments (identified by suffix A, B, C, etc.). See for example, puzzle piece 34 comprising first, second, and third segments 34A, 34B, 34C, and puzzle piece 42 comprising first, second, third, and fourth segments 42A, 42B, 42C, 42D. All of the segments of each puzzle piece 34-50 can fit together with one another, much like a puzzle of their own, to define the complete puzzle piece. The complete puzzle piece can, in turn, have a shape that fits or mates with the corresponding cutout. Additionally, each segment can have the same number of sides as the puzzle piece itself, as well as the corresponding cutout. For example, referring to five-sided (pentagonal) puzzle piece 34A, each segment 34A, 34B, 34C can in turn have five sides, as does the corresponding pentagonal cutout 14.

Figure 7:
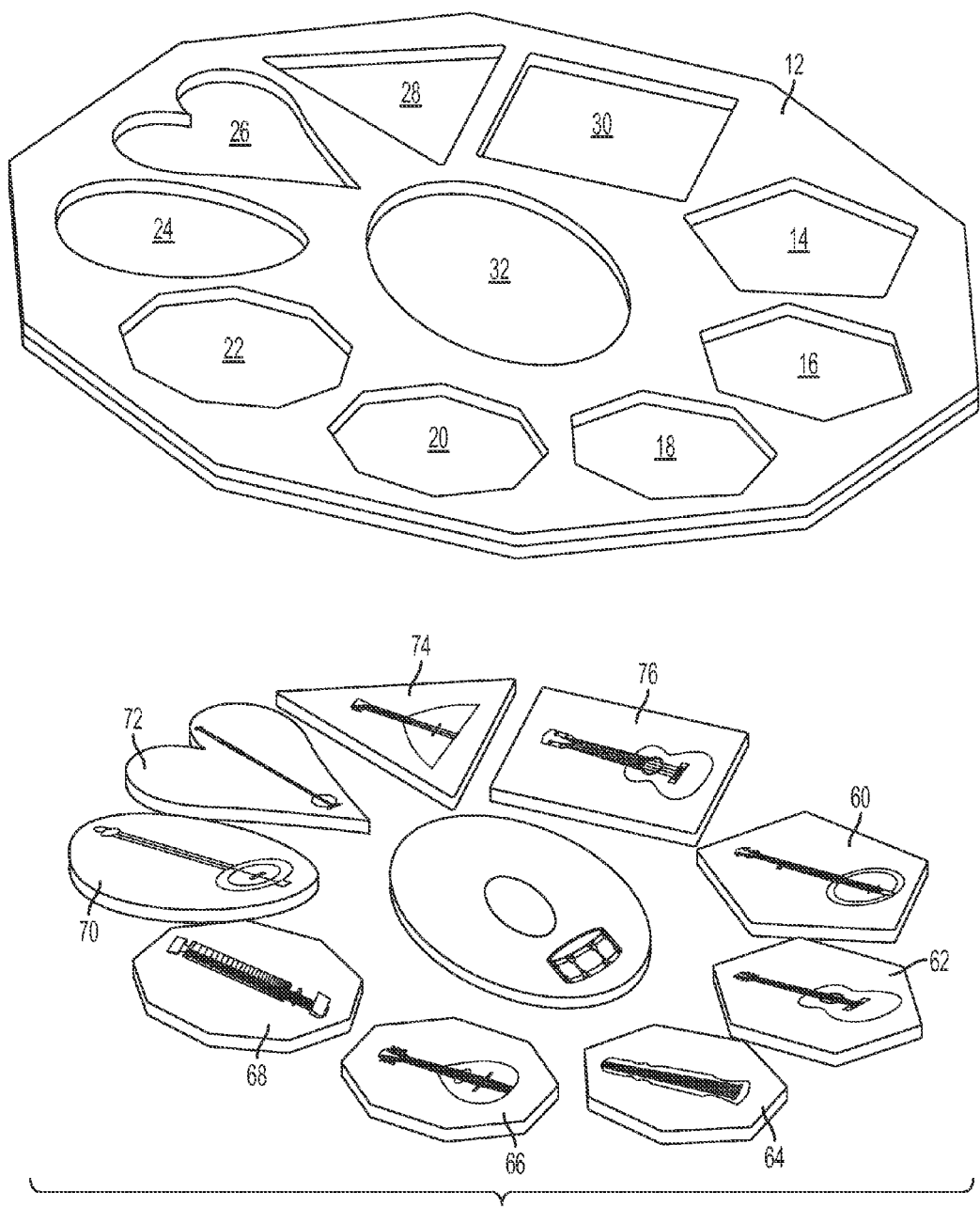
FIG. 7 is a perspective view of the puzzle of FIG. 5, shown with a set of image cards.

FIG. 7 depicts another aspect of the puzzle 10 that can be used with all the foregoing embodiments of FIGS. 1-6. As shown in FIG. 7, the puzzle 10 can include a plurality of image cards 60, 62, 64, 66, 68, 70, 72, 74, 76, which can be similar to the puzzle pieces, or alternatively, can be of thinner construction. Each image card 60-76 can have a shape corresponding to one of the cutouts 14-30 in the puzzle board 12. Although only nine image cards 60-76 are shown in FIG. 7, embodiments can have significantly more image cards, for example, up to 50 image cards or more. Although not shown, image cards can also be provided corresponding to the round or oval cutout 32, which represents the number zero.

Still referring to FIG. 7, each image card can depict an image having some kind of mathematical correlation to the cutout 14-32 into which the image card fits. For example, the images can be of animals, where a glass lizard represents zero, a narwhal represents one, a camel represents two (two humps), a three-toed sloth represents three, a kitten represents four (legs), a starfish represents five, a bee in a honeycomb represents six, a ladybug represents seven (spots), an octopus represents eight, and a nine-spotted moth represents nine. Other relationships can exist between the image cards and corresponding cutouts into which they fit, such as, for example, images of dominos (0-9 dots), irregular shapes, (0-9 points), stringed musical instruments (0-9 strings), and American sign language representing numbers zero to nine. FIG. 7 depicts an embodiment where the image cards depict instruments, with the a drum representing zero (no strings), an ektara representing one (one string), an ehru representing two (two strings), a balalaika representing three (three strings), an ukulele representing four (four strings), a banjo representing five (five strings), a guitar representing six (six strings), a guqin representing seven (seven strings), a mandolin representing eight (eight strings), and a kelstone representing nine (nine strings).

Although not shown, blank image cards can also be provided, e.g., for the user to draw their own images. Blank puzzle-shapes cards can allow the user to create their own mathematical correlations, and learn to trace the Arabic numbers by removing the Arabic number piece.

One of ordinary skill in the art will understand based on this disclosure that the invention is not limited to the specific shape or configuration of board 12, or number, shape, and appearance of cutouts, puzzle pieces, and image cards, but that any number of variations can be implemented based on the underlying principles described herein. Furthermore, the puzzle 10 and its various parts can be constructed using any number of techniques in the art. For example, embodiments can be constructed from paper, cardboard, plastic, or wood. Alternatively, embodiments can be implemented in electronic form, such as an internet-based format, a smartphone app, or a computer program, where the various parts of the puzzle 10 are depicted on the screen of a computer, tablet, smartphone, or other device. Accordingly, the invention should not be limited to embodiment in any specific form or media.

The puzzle 10 and its various embodiments can be used to play a variety of games, either alone or with a group of people. According to an embodiment, the player can remove the puzzle board 12, puzzle pieces, and/or image cards from a bag or box, and place them onto a table. Alternatively, the board 12 can be turned over to dump the pieces onto the table.

The player can place a set of image cards into the cutouts 14-32 in puzzle base. The player can use all the same category of image cards (such as animals or dominos) or mix them up. Using the image cards and puzzle pieces, the player can try to reassemble the puzzle 10 as quickly as possible by placing the puzzle pieces within their corresponding cutout in the puzzle board 12. As the embodiment of FIGS. 1-2 becomes easy, the player can progress to the embodiments of FIGS. 3-4 and 5-6.

The various mathematical relationships described above can be used to guide the players in assembling the puzzle 10. For example, the players can count the number of sides or points on each puzzle piece 34-50 to determine which cutout 14-30 the puzzle piece fits into. Additionally, for the embodiments of FIGS. 1-2 and 3-4, the number represented by the second segment in FIGS. 1-2 and third segment in FIGS. 3-4 can guide the player in determining how the segments fit together and/or where the puzzle pieces fit. This also applies for the number of points on the star represented by the fourth segment in the embodiment of FIGS. 3-4. The shape alone of the cutouts, puzzle pieces, segments, and image cards can also be used to guide the player in assembling the puzzle 10.

The puzzle 10 can also be used to play memory games, for example, using the image cards. For example, the players can take all the image cards from a certain category (such as animals) and place them face-down on a table. The player can look at the shape of each card to determine its related number. The player can then turn the card over to discover the linkage with the animal (or other image) depicted on the image card. This can promote learning by causing the player to think about why the animal was chosen: what links it to the number? After reviewing all the cards, the player can turn the cards back over (face down). Without turning the cards back over again, the player can look and feel the card's shape and remember which animal is related to the card's numeric count.

For a more challenging memory game, the players can place all of the image cards facedown. The players can take turns turning over two image cards to see if they can match a pair by number (e.g., both image cards are shapes with four sides or four points) or category (e.g., both cards are stringed instruments). Another option is to increase the number of image cards that players match. For example, the players can try to find all of the image cards with the same shape or series (such as stringed instruments).

According to another embodiment particularly suited for young children, players can practice writing numbers and drawing shapes using the puzzle pieces, for example, those of FIGS. 1-2. The players can place the first segments over a piece of paper with the second segments removed, and use a crayon or pencil to trace the number and the shape.

Additionally, players can use blank image cards to create their own image cards. For example, a blank set of image cards can be used to learn how to draw the numbers or shapes, and/or for the players to create their own number linkages between the number of sides of the card and an image they draw on the card. According to an embodiment, one player can identify a category or set of images that relate to each number, e.g., sports, nature, art, vehicles, etc. The player can draw his or her own set of image cards based on the category, and challenge another player to understand the mathematical relationships between the shape of each image card and the image drawn on it.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A puzzle, comprising:
  a puzzle board having a plurality of cutouts, each cutout having a different geometric shape having sides or edges defining the geometric shape; and
  a plurality of puzzle pieces geometrically shaped to fit within the cutouts, at least some of the puzzle pieces comprising at least a first segment and a second segment that mate with one another and fit within the cutouts,
  wherein the at least first segment and second segment each have the same number of sides as its corresponding cutout;
  wherein a third segment has a mathematical correlation to the cutout into which the first, second and third segments fit,
  wherein the mathematical correlation relates to a numerical value of the cutout sides such that the third segment is in the shape of a numerical value of the cutout sides.

2. The puzzle of claim 1, wherein the first segment and the second segment mate with one another, and together define the same shape as the cutout into which the puzzle piece fits.

3. The puzzle of claim 2, wherein at least some of the puzzle pieces comprise
  the third segment and a fourth segment, wherein the third segment fits into an opening in the first segment and the fourth segment fits into an opening in the second segment,
  wherein the third and fourth segments have a mathematical correlation to the cutout into which the puzzle piece fits, wherein the mathematical correlation relates to a numerical value of the cutout sides such that the third or fourth segment features an image having a direct relationship to the numerical value of the cutout sides.

4. The puzzle of claim 3, wherein at least some of the fourth segments are star shaped.

5. The puzzle of claim 1, wherein the geometric shape is selected from the group consisting of egg-shaped, heart-shaped, triangle, square, rectangle, pentagon, hexagon, heptagon, octagon, nonagon, and decagon.

6. The puzzle of claim 1, further comprising a substantially round cutout in the puzzle board, and a substantially round puzzle piece that fits into the substantially round cutout.

7. The puzzle of claim 1, further comprising a plurality of image cards, each image card having a shape corresponding to one of the cutouts in the puzzle board.

8. The puzzle of claim 7, wherein each image card depicts an image having a mathematical correlation to the cutout into which the image card fits.

9. The puzzle of claim 8, wherein the image is selected from the group consisting of animals, dominos, shapes, instruments, and sign language.

10. A method of assembling a puzzle, comprising:
  providing a puzzle board having a plurality of cutouts, each cutout having a different geometric shape having sides or edges defining the geometric shape;
  providing a plurality of puzzle pieces, at least some of the puzzle pieces comprising at least a first segment and a second segment that mate with one another; and
  inserting each segment into a cutout, wherein each segment has the same number of sides as its respective cutout,
  wherein a third segment has a mathematical correlation to the cutout into which the first, second and third segments fit, wherein the mathematical correlation relates to a numerical value of the cutout sides, and wherein the third segment is in the shape of a numerical value of the cutout sides.

11. The method of claim 10, wherein the geometric shape of the cutouts is selected from the group consisting of egg-shaped, heart-shaped, triangle, square, rectangle, pentagon, hexagon, heptagon, octagon, nonagon, and decagon.

12. The method of claim 10, further comprising placing a substantially round puzzle piece into a substantially round cutout in the puzzle board.

13. The method of claim 10, further comprising:
  providing a plurality of image cards, each image card having a shape corresponding to one of the cutouts in the puzzle board.

14. The method of claim 13, further comprising placing the image cards on the cutouts in the puzzle board based on an image on each image card with, wherein each image card depicts an image having a mathematical correlation to the cutout into which the image card fits.

15. The method of claim 14, wherein the image is selected from the group consisting of animals, dominos, shapes, instruments, and sign language.

16. A puzzle, comprising:
a puzzle board having a plurality of cutouts, each cutout having a different geometric shape having sides or edges defining the geometric shape; and
a plurality of puzzle pieces geometrically shaped to fit within the cutouts, at least some of the puzzle pieces comprising at least a first segment and a second segment that mate with one another and fit within the cutouts,
wherein the at least first segment and second segment have the same number of sides as its corresponding cutout;
wherein a third segment is shaped to fit within the first or second segment and has a mathematical correlation to the cutout into which the puzzle piece fits, wherein the mathematical correlation relates to a numerical value of the cutout sides such that the third segment features a non-numerical image having a direct relationship to the numerical value of the cutout sides.

17. The puzzle of claim 16, wherein the non-numerical image comprises animals, instruments, toys or sign language.

* * * * *